(12) United States Patent
Lemmon et al.

(10) Patent No.: US 9,095,001 B2
(45) Date of Patent: Jul. 28, 2015

(54) SYSTEM AND METHOD FOR MANAGEMENT OF WIRELESS DEVICES ABOARD AN AIRCRAFT

(75) Inventors: Andrew N. Lemmon, Collierville, TN (US); Ole-Petter Skaaksrud, Lakeland, TN (US); J. Randy Jacobs, Collierville, TN (US)

(73) Assignee: FEDERAL EXPRESS CORPORATION, Memphis, TN (US)

( * ) Notice: Subject to any disclaimer, the term of this patent is extended or adjusted under 35 U.S.C. 154(b) by 307 days.

(21) Appl. No.: 12/761,963

(22) Filed: Apr. 16, 2010

(65) Prior Publication Data

US 2010/0267375 A1    Oct. 21, 2010

Related U.S. Application Data

(60) Provisional application No. 61/202,887, filed on Apr. 16, 2009, provisional application No. 61/272,458, filed on Sep. 25, 2009.

(51) Int. Cl.
*H04W 4/00* (2009.01)
*H04M 3/16* (2006.01)
(Continued)

(52) U.S. Cl.
CPC ............ *H04W 84/18* (2013.01); *G06F 21/74* (2013.01); *H04M 1/66* (2013.01); *H04M 1/72525* (2013.01); *H04M 1/72577* (2013.01);
(Continued)

(58) Field of Classification Search
CPC ....... H04W 8/245; H04W 88/02; H04W 4/00; H04W 8/00; H04W 3/24; G06F 1/26; H04B 1/04; G08B 21/00
USPC ............................. 455/418–420, 414.2, 26.1, 455/127.1–127.3, 431
See application file for complete search history.

(56) References Cited

U.S. PATENT DOCUMENTS 6,421,622 B1    7/2002    Horton et al.
7,216,055 B1    5/2007    Horton et al.
(Continued)

FOREIGN PATENT DOCUMENTS

CN    101124842 A    2/2008
GB    2 354 405 A    3/2001
(Continued)

OTHER PUBLICATIONS

PCT International Search Report and PCT Written Opinion of the International Searching Authority mailed Aug. 2, 2010 (11 pages total).
(Continued)

*Primary Examiner* — Khawar Iqbal
(74) *Attorney, Agent, or Firm* — Finnegan, Henderson, Farabow, Garrett & Dunner, L.L.P.

(57) ABSTRACT

A method of management of a wireless device in an aircraft may include transitioning the wireless device from a first mode to a second mode based on data that is indicative of a change in flight condition of the aircraft. One of these modes may be a state of the device in which a transmitter of the device is deactivated and the other mode may be a state of the device in which the transmitter is activated. The data indicative of the change in flight condition may either be downloaded to the device from an external source, acquired from a sensor(s) embedded in the device, or may be determined based on both the data acquired by the sensor(s) and data downloaded to the device.

42 Claims, 7 Drawing Sheets

(51) Int. Cl.

| | | |
|---|---|---|
| *H04W 84/18* | (2009.01) | |
| *G06F 21/74* | (2013.01) | |
| *H04M 1/66* | (2006.01) | |
| *H04M 1/725* | (2006.01) | |
| *H04M 1/60* | (2006.01) | |
| *H04W 4/02* | (2009.01) | |

(52) U.S. Cl.
CPC . *G06F2221/2105* (2013.01); *G06F 2221/2111* (2013.01); *H04M 1/6075* (2013.01); *H04M 1/72572* (2013.01); *H04M 2250/12* (2013.01); *H04W 4/027* (2013.01)

(56) References Cited

U.S. PATENT DOCUMENTS

| | | | |
|---|---|---|---|
| 7,418,364 | B1 | 8/2008 | Horton et al. |
| 7,791,455 | B1 | 9/2010 | MacLean, III et al. |
| 8,606,253 | B2 * | 12/2013 | Ahn et al. ............... 455/418 |
| 8,634,827 | B2 * | 1/2014 | Melum et al. ............ 455/431 |
| 2005/0267650 | A1 * | 12/2005 | Carpenter et al. ........... 701/3 |
| 2006/0178108 | A1 | 8/2006 | Chotoku et al. |
| 2007/0072553 | A1 | 3/2007 | Barbera |
| 2008/0004040 | A1 * | 1/2008 | Bogart .................. 455/456.1 |
| 2008/0214161 | A1 | 9/2008 | Jakl |
| 2009/0310580 | A1 * | 12/2009 | Chapman et al. ........... 370/338 |
| 2009/0322488 | A1 * | 12/2009 | Kanagala et al. ........... 340/10.3 |
| 2010/0087190 | A1 * | 4/2010 | Pandit et al. ............... 455/431 |
| 2010/0167716 | A1 * | 7/2010 | Howarter et al. ........... 455/419 |
| 2010/0248662 | A1 * | 9/2010 | Sheynblat et al. ........ 455/127.1 |
| 2010/0323657 | A1 * | 12/2010 | Barnard et al. ........... 455/404.1 |
| 2011/0038348 | A1 * | 2/2011 | Borsella et al. ............ 370/331 |
| 2012/0057731 | A1 * | 3/2012 | Wai ........................ 381/300 |
| 2012/0208594 | A1 * | 8/2012 | Tanaka ..................... 455/556.1 |
| 2012/0264409 | A1 * | 10/2012 | Geyer et al. ............... 455/415 |
| 2013/0024536 | A1 * | 1/2013 | Rybak ...................... 709/206 |

FOREIGN PATENT DOCUMENTS

| | | |
|---|---|---|
| JP | 2002-517143 | 6/2002 |
| JP | 2006-221353 | 8/2006 |
| JP | 2006-270457 | 10/2006 |
| WO | WO 99/62277 | 12/1999 |
| WO | WO 02/28036 A1 | 4/2002 |

OTHER PUBLICATIONS

Office Action in copending Japanese Patent Application No. 2012-505967 dated Feb. 4, 2014 (15 pages).

Third Office Action in copending Chinese Patent Application No. 201080016981.9 dated May 4, 2014 (28 pages), and translation.

Second Office Action in copending Chinese Patent Application No. 201080016981.9 dated Dec. 12, 2013 (33 pages), and translation.

First Office Action in copending Chinese Patent Application No. 201080016981.9 dated May 9, 2013 (30 pages), and translation.

* cited by examiner

SYSTEM AND METHOD FOR MANAGEMENT OF WIRELESS DEVICES ABOARD AN AIRCRAFT

CROSS RELATED TO RELATED APPLICATIONS

This application is based upon and claims the benefit of priority from U.S. Provisional Application No. 61/202,887 to Lemmon filed on Apr. 16, 2009 and U.S. Provisional Application No. 61/272,458 to Lemmon et at. filed on Sep. 25, 2009, which are both incorporated in their entirety by reference herein.

FIELD OF THE INVENTION

This disclosure generally relates to systems and methods for automatic management of wireless devices. For example, in one embodiment, this disclosure relates to systems and methods to ensure compliance of wireless devices to governmental or other regulations governing the use of such wireless devices aboard an aircraft.

BACKGROUND OF THE INVENTION

The increasing use of cellular telephones and other wireless devices in the recent years has made the enforcement of federal regulations on airborne use of such devices difficult. One recent study suggests that the unauthorized use of cellular phones aboard commercial flights in the Eastern United States occurs with a frequency of one to four voice calls per flight. B. Strauss, M. G. Morgan, J. Apt, and D. D. Stancil, "Unsafe at any airspeed?," IEEE Spectrum, March 2006. The easy availability of inexpensive wireless GPS tracking products in recent years has also enabled real-time package tracking easy. Anecdotal evidence suggests that wireless monitoring equipment is regularly placed inside packages aboard cargo airlines, by shippers of high-value goods for real-time monitoring purposes.

The increasing use of cell phone technology within an aircraft has given rise to several safety concerns. Notable among these is the concern that cellular phones may impose an electromagnetic interference (EMI) risk to the electronic components of commercial aircraft. This concern has resulted in several federal regulations designed to broadly prohibit the operation of cellular phones aboard aircraft. These federal regulations prohibit the use of wireless devices any time an aircraft is not in contact with the ground. In passenger airlines, these regulations are typically enforced by means of cabin announcements and passenger monitoring. However, in some cases, these methods may be inadequate. Additionally, these enforcement mechanisms may not be suitable for cargo airlines. This difficulty in enforcement may make a cargo carrier an unwitting accomplice in the violation of the federal regulations, since the operator often does know whether the cargo contains wireless tracking devices. With the widespread use of cellular phones and other wireless devices onboard aircraft, and the difficulty of enforcing regulations restricting such use, it would be beneficial to automate compliance with the applicable federal regulations.

SUMMARY OF THE INVENTION

In one aspect, a method of management of a wireless device in an aircraft is disclosed. The method may include transitioning the device from a first mode to a second mode based on data that is indicative of a change in flight condition of the aircraft. One of the modes (first mode or second mode) may be a state of the device in which a transmitter of the device is deactivated and the other mode may be the state of the device in which the transmitter is activated. In some embodiments, the first mode and the second mode may each correspond to a different one of a normal mode, a disabled mode, and an airborne mode. The normal mode may be a state of the wireless device in which the device and a transmitter of the device are activated. The disabled mode may be a state of the device in which both the transmitter and the device are deactivated. And, the airborne mode may be a state of the device in which the device is activated while the transmitter is deactivated. The data indicative of the change in flight condition may be downloaded to the device from a source external to the device, or may be acquired from sensor(s) embedded in the device. In some embodiments, the data indicative of the change in flight condition may be determined based on both the data acquired by sensor(s) and the data downloaded to the device.

In another aspect, a system for management of a wireless device in an aircraft is disclosed. The system may include a wireless device configured to be positioned within the aircraft, and software residing in the wireless device. The software may be configured to transition the wireless device from the normal mode to the disabled mode during aircraft takeoff. The software may also be configured to transition the device from the disabled mode to the normal mode after aircraft landing. In some embodiments, the software may be further configured to transition the device from the disabled mode to the airborne mode after aircraft takeoff, and transition the device from the airborne mode to the disabled mode during descent of the aircraft.

In another aspect, a computer for management of a wireless device is disclosed. The computer may include software configured to transition the wireless device from a first mode to a second mode upon receipt of data that is indicative of a change in flight condition of the aircraft. One of the modes (first mode or second mode) may be a state of the device in which a transmitter of the device is deactivated and the other mode may be the state of the device in which the transmitter is activated. In some embodiments, the first mode and the second mode may each correspond to a different one of a normal mode, a disabled mode, and an airborne mode.

In a further aspect, a wireless device is disclosed. The wireless device may include a sensor configured to measure one or more environmental parameters associated with a change in a flight condition of an aircraft. The wireless device may also include a processor that is configured to receive real-time signals from the sensor and change an operating state of a transmitter of the wireless device based on the received signals.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Although the current invention is applicable for controlling a wireless device operating in any environment, an exemplary case of controlling a wireless device contained within a commercial jet aircraft is described herein for brevity. The different stages of aircraft flight, from take-off to landing, have been extensively studied, and there are several federal regulations that govern each stage of aircraft flight. This disclosure is directed to methods and systems for automating conformance of a wireless device to these regulations aboard an aircraft. It should be noted that, although the case of ensuring compliance of a wireless device to federal aviation regulations is described, the disclosed systems and methods can be used to automate compliance of a wireless device to any regulations, private or public, relating to the use of such wireless devices.

Figure 1:
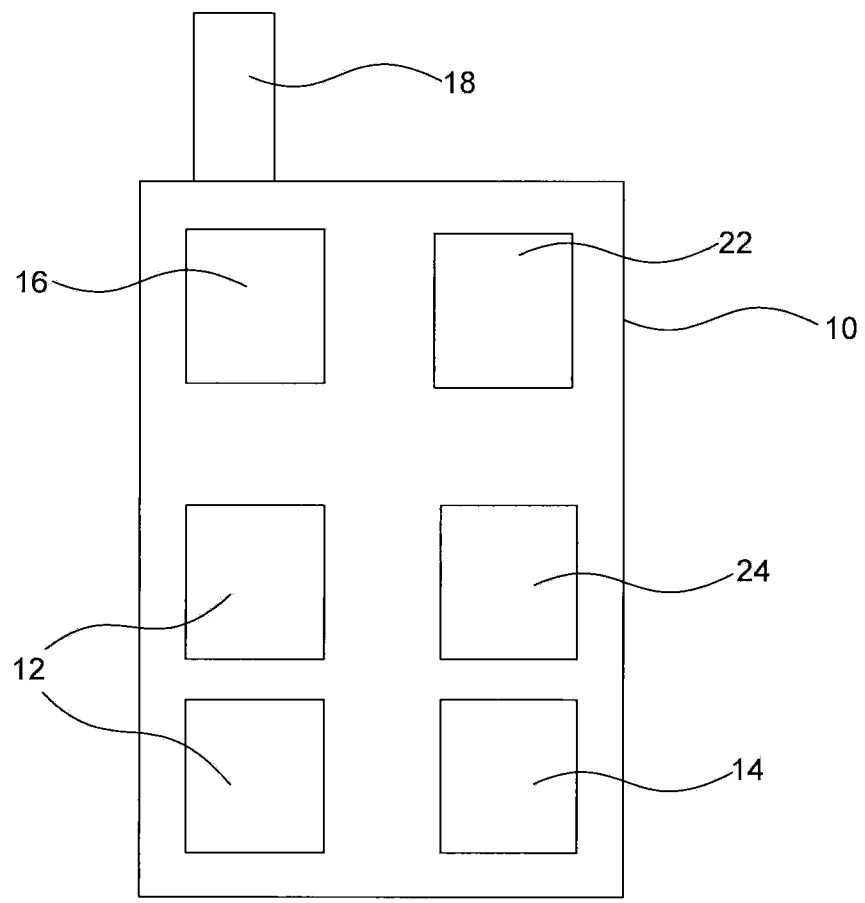
FIG. 1 is a schematic illustration of an exemplary embodiment of a wireless device.

A Wireless Management System ("WMS") may be used for automatic control of a wireless device within an aircraft. FIG. 1 illustrates a schematic of an exemplary embodiment of a wireless device 10 that may be controlled with a WMS. The wireless device 10 may include one or more sensors 12 and a processor 14 embedded within the wireless device 10. Processor 14 may include any type of processor known in the art (such as, for example, CPU's, ASICs, FPGAs, etc.). Processor 14 may perform steps or methods consistent with disclosed embodiments by reading instructions from a non-transitory computer-readable storage medium (memory 24) of device 10, and executing the instructions. Although the non-transitory computer-readable storage medium (memory 24) is shown as a separate component from processor 14 in FIG. 1, it is contemplated that, in some embodiments, the non-transitory computer-readable storage medium may be a part of processor 14. It is also contemplated that in some embodiments the non-transitory computer-readable storage medium 45 may be a portable memory device, such as for example, a flash memory card, a secure digital memory card, a memory stick, etc. Memory 24 may include one or more memory or storage devices that store data as well as software.

Sensor(s) 12 may measure the environmental parameters of the wireless device 10, and processor 14 (with associated software) may monitor the measured environmental parameters real-time during aircraft operation. Sensor(s) 12 may include sensing devices such as an accelerometer that is configured to measure the acceleration or motion of device 10, and/or a pressure sensor(s) that is configured to measure the atmospheric pressure experienced by the device 10. Sensor(s) 12 may be similar to accelerometers that are incorporated into many modern cell phones to enable the phone to detect which way it is being held or to interpret movement of the phone as program input from the user. Wireless device 10 may also include a wireless transmitter 16 configured to transmit and receive wireless signals. These wireless signals are made up of electromagnetic radiation which are propagated into the atmosphere by an antenna 18. These electromagnetic emissions from wireless device 10 may interfere with the electrical circuitry of electrical/electronic devices operating in the vicinity of device 10 through a phenomenon known as electromagnetic interference or EMI. Electromagnetic interference may affect the effective performance of the affected electrical device. For a wireless device 10 operating in an aircraft, the affected device may be a component that performs a critical function of the aircraft.

Wireless device 10 may be configured to transition between different operational modes based on instructions from processor 14. These operational modes may include normal mode, disabled mode, and airborne mode. Normal mode represents the state of normal operation of wireless device 10. In this mode, the device 10 is powered on and its transmitter 16 is active and ready to send and receive signals. Under this operational mode, device 10 is able to communicate normally. Disabled mode represents a powered down state of device 10. In this state, the transmitter 16 and most other electronic systems within device 10 are inactive. However, some systems such as wake-up mechanism 22 of the device 10, are active even when device 10 is in disabled mode. Wake-up system 22 is configured to enable device 10 to transition from disabled mode to another mode (such as normal mode or airborne mode) automatically. When device 10 is in disabled mode, the device 10 emits minimal electromagnetic radiation. Wake-up mechanism 22 may be a mechanism that is similar to the real time clock component which is present in any modern laptop computers that maintains the system time even when the laptop computer is turned off. The electromagnetic emissions from the system clock in a laptop computer are so small that they may be exempt from federal or other regulations. This assertion may be shown to be true by virtue of the fact that laptops are allowed on an aircraft at all. Airborne mode may represent the state of wireless device 10 with the transmitter 16 disabled. In this state, device 10 may be powered on, with its transmitter 16 turned off. This state may correspond to the "flight mode" currently available on many commercial smart phones and PDA's.

Figure 2:
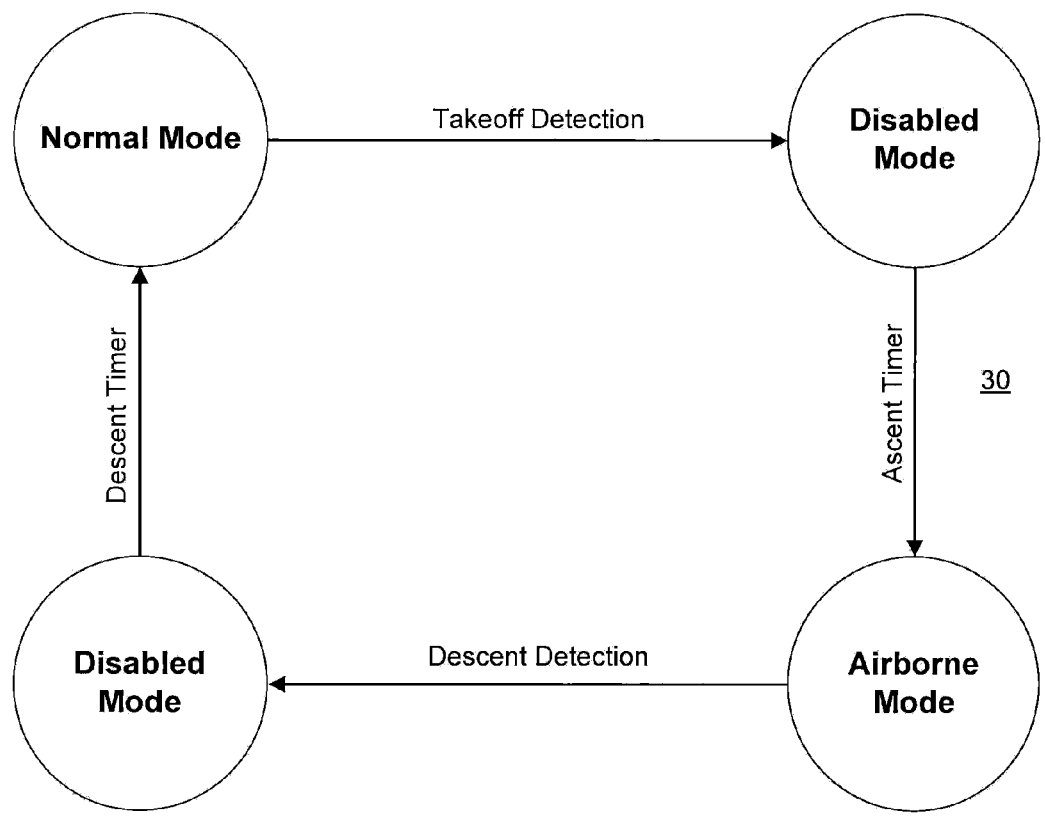
FIG. 2 is a flow chart of an exemplary embodiment of a Wireless Management System (WMS) that may be used to control the device of FIG. 1.

FIG. 2 is a flow chart illustrating an embodiment of a WMS 30 that may used to control device 10 of FIG. 1. WMS 30 may embody a set of program instructions or software stored in memory 24 of device 10, that may be executed by processor 14 to control device 10. WMS 30 may be broadly classified as: (a) Device-centric WMS, (b) Hybrid WMS, and (c) Remote WMS, based on the method used to monitor and control device 10. In a device-centric WMS implementation, operation of device 10 may be controlled by processor 14 in real-time, based on the environmental parameters measured by sensor(s) 12. In Hybrid WMS, device 10 may be controlled by processor 14 using a combination of environmental parameters measured by sensor(s) 12 and other data. This other data may include information that resides within memory 24 of device 10, and/or information that resides on a computer system remote from device 10. In Remote WMS, device 10 may be controlled by processor 14 substantially using data provided to device 10 from a computer remote from device 10.

During operation, WMS 30 may transition the wireless device 10 between the normal mode, the disabled mode, and the airborne mode as shown in FIG. 2. WMS 30 may be configured to have no effect on the operation of device 10 when not in an aircraft. For instance, in some embodiments WMS 30 may only be activated upon the detection of aircraft takeoff. WMS 30 may continuously monitor the environmental parameters measured by sensor(s) 12 (or other data) to detect an aircraft takeoff event. When aircraft takeoff is detected, WMS 30 may transition device 10 to disabled mode and set a timer for the transition of device 10 to airborne mode. Upon expiry of this timer, WMS 30 may transition device 10 to airborne mode. While device 10 is in airborne mode, WMS 30 may monitor the environmental parameters for the indication that the aircraft is descending. Upon detecting the initiation of descent, WMS 30 may again transition device 10 to disabled mode and set a timer for transitioning device 10 back to normal mode. Upon expiry of this timer, WMS 30 may transition device 10 back to normal mode and continue to monitor the environmental parameters to detect another takeoff event. The following paragraphs discuss transition of device 10 between each of the three modes in more detail.

WMS 30 may run in the background in processor 14 of wireless device 10 and constantly (or periodically) monitor the measured environmental parameters to detect aircraft takeoff. Upon detection of aircraft takeoff, WMS 30 may transition device 10 to disabled mode. The takeoff detection feature of WMS 30 may be implemented in a variety of ways. For example, in a device-centric WMS embodiment, environmental parameters measured by sensor(s) 12 of device 10 may be used to detect aircraft takeoff. In a hybrid WMS embodiment, known information of flight details in conjunction with environmental parameters measured by sensor(s) 12 may be used to detect aircraft takeoff. In a remote WMS embodiment, information that is transmitted to device 10 and located in, or generated by, a computer or other electronic system that is remote from device 10 may be used to detect aircraft takeoff.

As described earlier, sensor(s) 12 of device 10 measures an environmental parameter associated with device 10. When the measured environmental parameter exhibits a characteristic pattern known to be associated with aircraft takeoff, a takeoff event may be detected by WMS 30. Any environmental parameter that is capable of being correlated with aircraft takeoff may be used to detect the takeoff event. In one embodiment, sensor(s) 12 may be an accelerometer. In this embodiment, the measured environmental parameter may include the acceleration or vibration patterns experienced by device 10. In these embodiments, a takeoff event may be detected by WMS 30 when a measured acceleration profile corresponds to an acceleration profile that is known to be associated with takeoff of an aircraft. Upon detection of a takeoff event, WMS 30 may transition device 10 to disabled mode.

Figure 3:
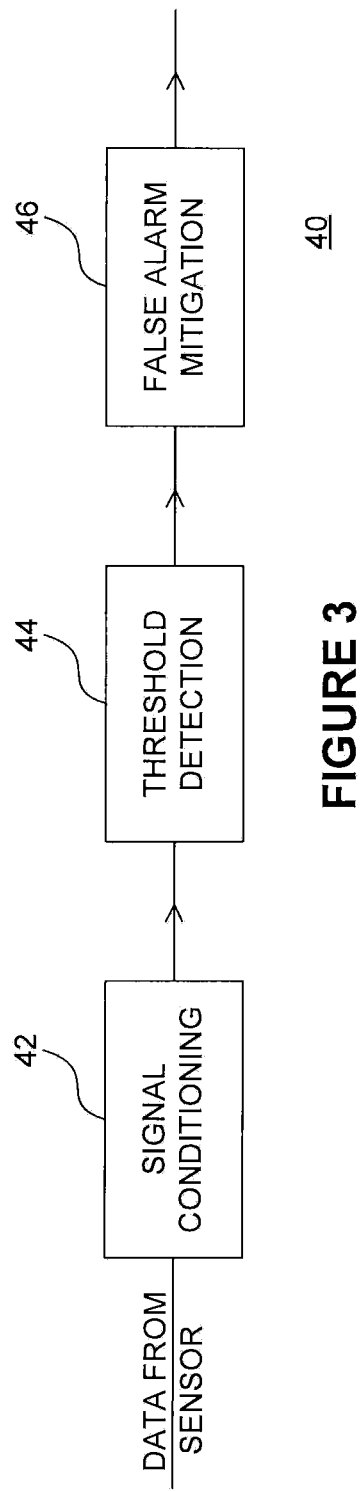
FIG. 3 is a schematic illustration of an exemplary signal detection algorithm of the WMS of FIG. 2.

In some embodiments, WMS 30 may include one or more signal processing algorithms to process the real-time data from sensor(s) 12 and to detect a takeoff event. An exemplary signal detection algorithm 40 may include three stages as illustrated in FIG. 3. These stages may include a signal conditioning stage 42, a threshold detection stage 44, and a false alarm mitigation stage 46. The development of an exemplary embodiment of a signal processing algorithm used to detect aircraft takeoff, using acceleration and rate of change of acceleration data (da/dt) acquired by an accelerometer embedded in a wireless device, is described in U.S. Provisional Application No. 61/202,887.

In the signal conditioning stage 42, the data from sensor(s) 12 may be filtered to remove high frequency noise. Any known filtering technique known in the art (such as, for example, a running average filter) may be used to filter the measured data. In some embodiments, one or more signal processing operations (such as, for example, differentiation, integration, etc.) may also be performed on the filtered data in the signal conditioning stage 42. These operations may extract features of interest from the processed signal. For instance, in an embodiment where sensor(s) 12 is an accelerometer, the signal conditioning stage may include a numerical differentiator to compute rate of change of acceleration (da/dt, also termed "jerk") from the filtered data. It should be noted that other mathematical operations, such as numerical integration to compute an area, may also be performed in other embodiments. Other known signal processing operations, such as the matched filter and the wavelet transform may be used for the purpose of extracting features of interest from the processed signal. Since these signal-processing mechanisms are known in the art, their details are not discussed herein.

Figure 4:
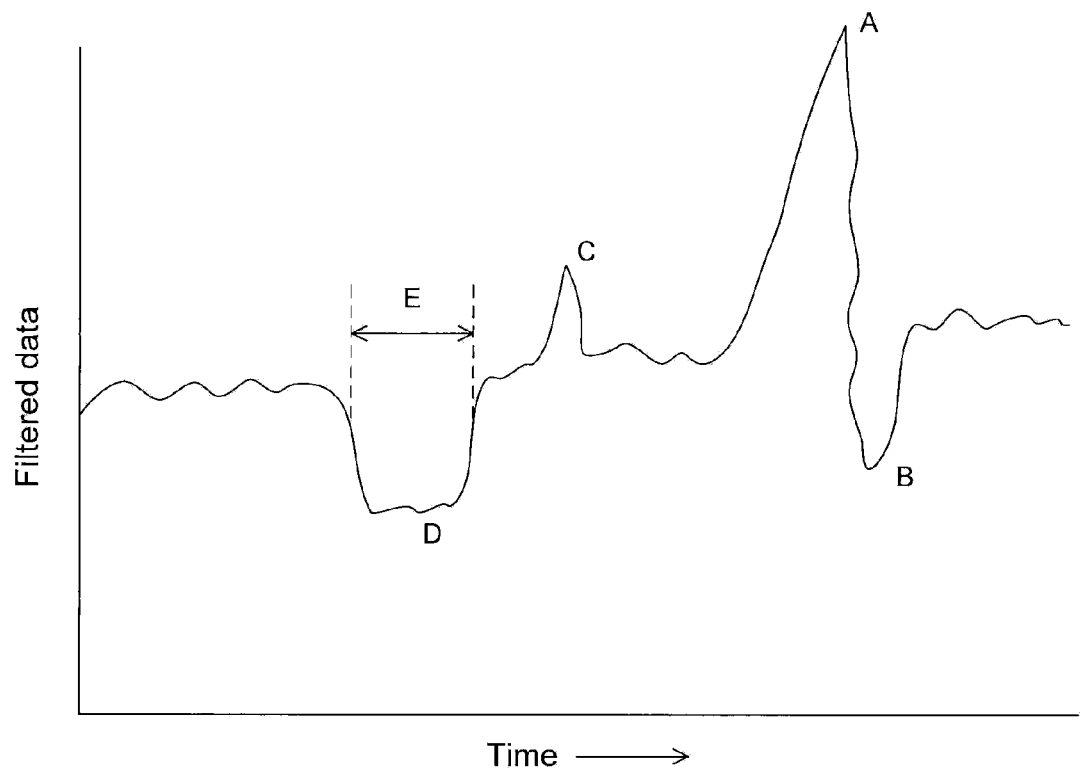
FIG. 4 is an illustration of exemplary filtered data exiting the signal conditioning stage of the signal detection algorithm of FIG. 3.

FIG. 4 is an illustration of the filtered data exiting the signal conditioning stage 42. In the threshold detection stage 44, this filtered data is compared with a profile that is known to correspond with aircraft takeoff. For instance, based on empirical data, a user may know that the profile corresponding to the signal in the region marked A may indicate a takeoff event. Based on this knowledge, the threshold detection stage 44 may search for characteristics of the signal that matches profile A. These characteristics may include any detectable characteristic (strength, width, etc.) of the signal. Upon detection of such a profile, the threshold detection stage 44 may indicate a preliminary takeoff event. In some embodiments, the threshold detection stage 44 may only indicate a preliminary takeoff event upon the detection of multiple characteristics of the signal. For instance, a preliminary takeoff event may only be indicated when both a profile corresponding to the signal in the region marked A and a profile in the region marked B are observed.

The output from the threshold detection stage 44 may be directed to a false alarm mitigation stage 46 to reduce false alarms. False alarm is an erroneous detection of a takeoff event as a result of the detection of a signal profile that mimics a profile observed during aircraft takeoff. Mistaking a false alarm for a takeoff event may erroneously disable the wireless device 10 and reduce the reliability of WMS 30. False alarm mitigation stage 46 may involve the detection of one or more common characteristics, representative of a false takeoff, in the observed signal profile. For instance, based on empirical data, it may be known that the presence of some or all of the signal characteristics corresponding to C, D, and E in FIG. 4 may indicate a false alarm. Based on this knowledge, the false alarm mitigation stage 46 may scrutinize a signal that indicates a preliminary takeoff for the presence of signal characteristics corresponding to C, D, and E. If these characteristics are present in the signal, false alarm mitigation stage 46 may flag the detected preliminary takeoff as a false alarm. In this manner, the false alarm mitigation stage 46 may ensure that a detected takeoff event in fact corresponds to actual aircraft takeoff.

The false alarm mitigation stage 46 may include multiple steps to evaluate whether a detected takeoff signal includes characteristics that are known to be associated with a false alarm. For instance, in one embodiment of the signal detection algorithm 40 illustrated in FIG. 5, the false alarm mitigation stage 46 may be configured to search for characteristics associated with three known sources of false alarms. These multiple steps may include a quiet detect step 26A, a gravity detect step 46B, and a gravity transition detect step 46C.

Figure 6:
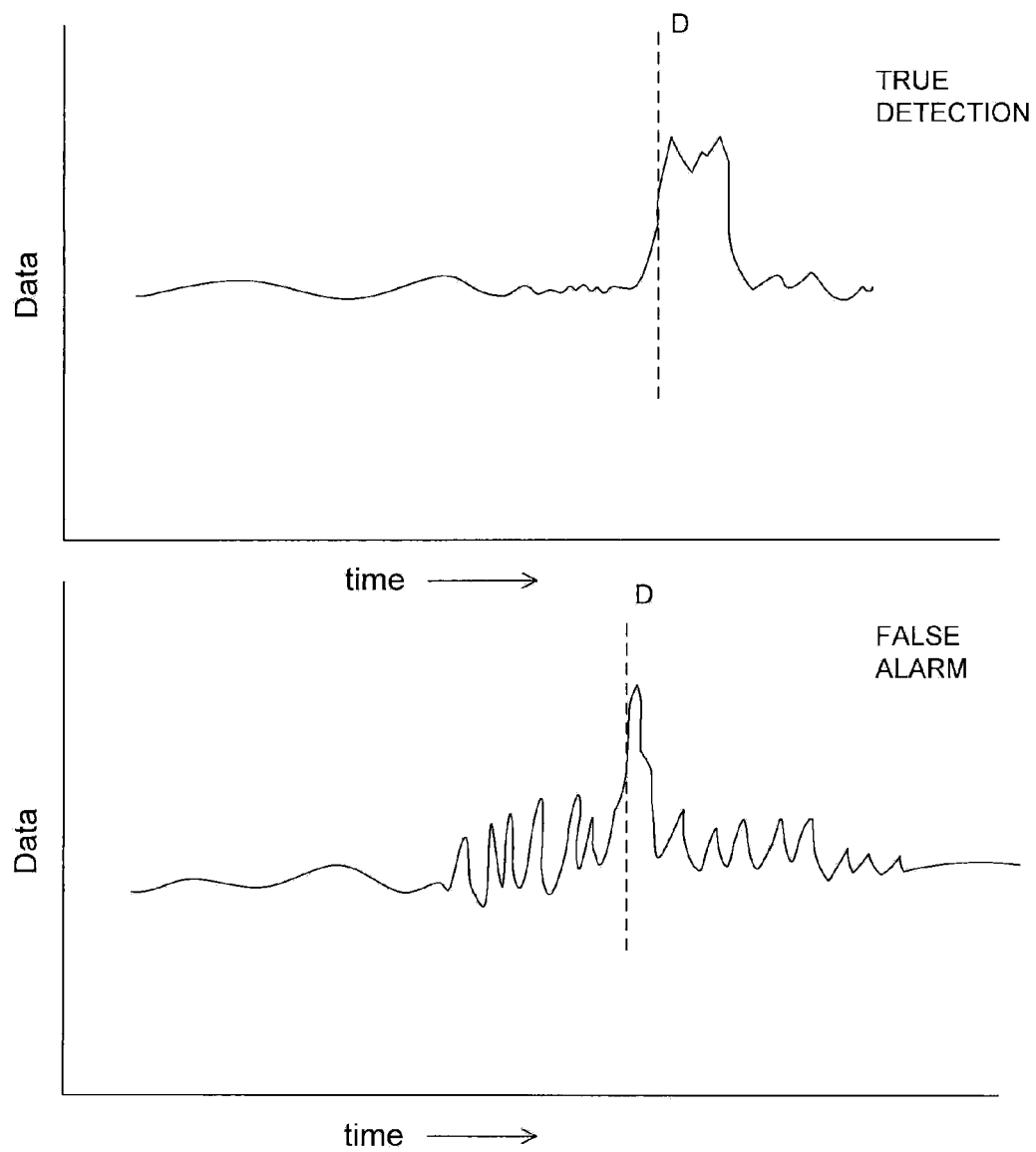
FIG. 6 is a graph illustrating the difference between an instance of false alarm and an instance of true takeoff detection in the exemplary signal detection algorithm of FIG. 3.

Empirical testing using acceleration and jerk data acquired by an accelerometer embedded within device 10 showed that several minutes of data preceding a takeoff detection event were different between instances of false alarm and instances of true takeoff detection. FIG. 6 is a graph illustrating the difference between an instance of false alarm and an instance of true takeoff detection. The dashed line marked "D" in the top subplot indicates a true takeoff detection and the dashed line marked "D" in the bottom subplot indicates a false alarm.

As illustrated in the bottom subplot of FIG. 6, the false alarm signal is characterized by signal noise both before and after the detection event. In this bottom subplot, a takeoff-like perturbation adjacent to indicator line D triggered the detection event. Compared to the false alarm signal of FIG. 6, the true takeoff detection subplot of FIG. 6 shows that the signal in a region adjacent to the indicator line D is quiet. Further analysis of this distinction between the two cases indicated that the signal noise in the case of a false alarm was due to changes in vehicle motion in stop-and-go traffic.

Figure 5:
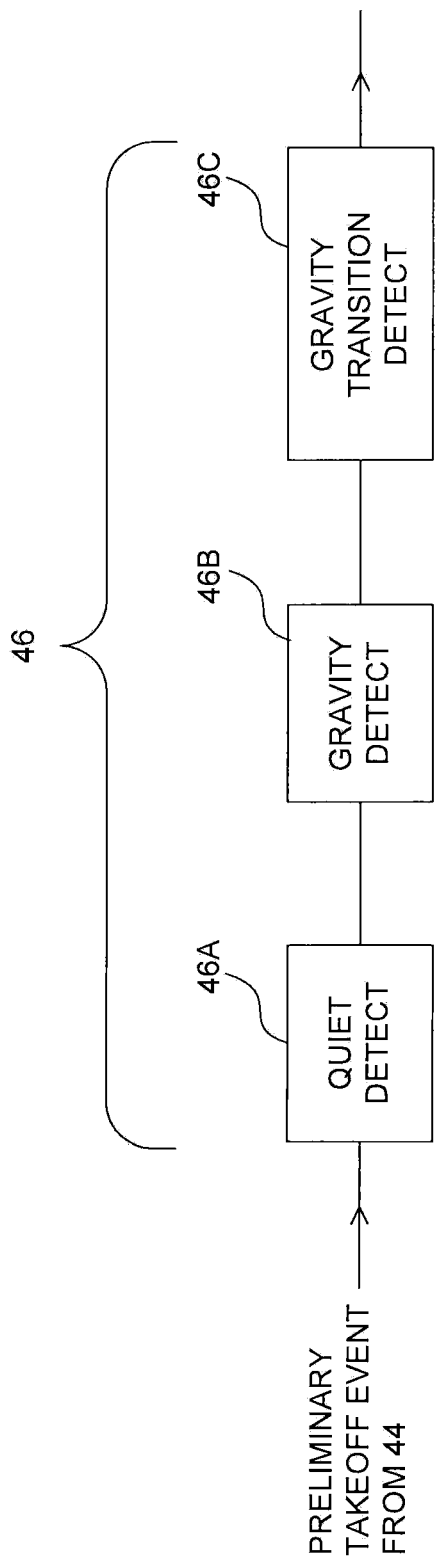
FIG. 5 is an illustration of an exemplary false alarm mitigation stage of the signal detection algorithm of FIG. 3.

The quiet detect step 46A of FIG. 5 may identify a false alarm that arises due to signal noise. The quiet detect step 46A may incorporate a requirement of a quiescent condition in the signal in a region immediately preceding and/or succeeding a detection event. The length of this region and the acceptable threshold of noise in this region may be selected based on the application. If this region of the signal includes noise, WMS 30 may disregard the detected takeoff event as a false alarm.

Another observation made with regard to false alarms during empirical testing using three-axis accelerometers was that, frequently false alarms occur due to spurious signals on the axis which is most vertically oriented in device 10. In an ideal scenario, acceleration data on a vertical axis will show a 1 G offset due to the force of gravity. However, since the orientation of device 10 cannot be controlled in practice, none of the axes of a three-axis accelerometer may be perfectly vertically aligned. This lack of control may create a gravity offset on the most vertically aligned axis to be different from 1 G, making it difficult to distinguish the gravity offset effect from the acceleration experienced during takeoff. However, the orientation of the sensor(s) can be identified by comparing the magnitudes of the acceleration signals from the three axes.

The gravity detect step 46B of FIG. 5 may identify a false alarm that arises due to spurious signals on the most vertically aligned axis, by identifying and disregarding detection events that are triggered by signals from this axis. The gravity detect step 46B may identify a detection event that is triggered by the most vertically aligned axis by comparing a mean of the data in a region immediately preceding a detection event to a threshold value. If this mean is greater than a preselected threshold, the detection event is discarded as a false alarm. In general, the threshold may be selected based on the application. During empirical testing, a threshold value of 500 mG was found suitable to detect the most vertically aligned axis.

During empirical testing, it was also observed that in some cases, false alarms are triggered by the change in observation of gravitational acceleration arising from a change in orientation of device 10. The attribute which distinguishes this type of false alarm from a true takeoff detection event is that in this type of false alarm, two of the accelerometer axes experience approximately equal perturbations which are opposite in sign. The gravity transition detect step 46C of FIG. 5 may identify a false alarm caused by this type of signal perturbation. To identify these false alarms, the gravity transition detect step 46C may compute a mean value of the signal for each axis of the accelerometer in the period beginning a few minutes before the alleged takeoff event. A 2-norm of these mean values is then calculated, and the result compared to a threshold. If the 2-norm value exceeds the threshold, the detected takeoff event may be disregarded as a false alarm.

It should be noted that the false alarm detection steps illustrated in FIG. 5 are exemplary only, and in general, a signal detection algorithm may include false alarm detection strategies that are suitable for a specific application. The signal detection algorithm 40 may be configured to be implemented on wireless device 10, and in some embodiments, the algorithm 40 may be configured to detect takeoff early enough so that device 10 may be transitioned to disabled mode before the aircraft leaves the ground.

After takeoff, WMS 30 may permit the operation of device 10 in a limited manner by transitioning the device from disabled mode to airborne mode (see FIG. 2). In some embodiments, device 10 may be transitioned to airborne mode after the aircraft has reached a predetermined altitude which ensures compliance with Federal regulations, such as for example, an altitude of 10,000 feet. Any technique may be used to transition device 10 from disabled mode to airborne mode. In some embodiments, a timer may used for this transition. As discussed earlier, wake-up mechanism 22 of device 10 may be active even when device 10 is in disabled mode. In some embodiments, wake-up mechanism 22 may be a real-time clock that maintains the system time when device 10 is in disabled mode. WMS 30 may use this real-time-clock to transition device 10 to airborne mode after a selected time interval beginning with the transition to disabled mode. In this embodiment, WMS 30 may use a mechanism currently available in most modern cellular phones by which the phones may be "woken up" from a disabled state at a specified time. WMS 30 may use this existing feature by setting a time interval for the transition to airborne mode before placing device 10 in disabled mode upon takeoff. The selected time interval for this transition may be calculated based on the aircraft climb rate or may be based on other information, such as takeoff times for different categories of aircraft. In some embodiments, this time interval may be less than or equal to about 30 minutes.

From airborne mode, device 10 may be transitioned to disabled mode again during aircraft descent. Any technique may be used to detect the initiation of aircraft descent and transition device 10 based on this detection. In some embodiments, sensor(s) 12 may be used to detect aircraft descent. This sensor(s) may be the same sensor(s) used to detect takeoff (such as, for example an accelerometer) or may be a different sensor(s) (such as, for example, an altitude sensor). For instance, in some embodiments, aircraft descent may be detected by monitoring the barometric pressure inside an aircraft cabin or cargo compartment during flight. Empirical data shows that barometric pressure within the aircraft shows detectable signals that correspond to different stages of an aircraft flight (doors closing, takeoff, cruise, descent, landing, etc.). In some embodiments of WMS 30, these detectable signals may be used to transition device 10 between different modes. An exemplary embodiment of a WMS using barometric pressure to detect aircraft takeoff and descent is described in U.S. Provisional application 61/272,458.

WMS 30 may use the observable variations in cabin air pressure during aircraft descent as a mechanism for detecting and transitioning the wireless device to disabled mode. WMS 30 may detect aircraft descent when the measured pressure value or pressure profile varies from a threshold range. As in case of takeoff detection, a signal detection algorithm may process signals from a sensor(s) and detect aircraft descent when the signal profile matches a known profile. For instance, in one embodiment, descent of the aircraft may be detected when the rate of change of pressure exceeds a selected threshold. The threshold may be selected based on the application. In some embodiments, the threshold value may be selected based on the elevation of the airport the aircraft is landing in. For instance, when landing in an airport at a high elevation, the change in cabin pressure after landing may be lower than when landing in an airport at sea level. WMS 30 may account for these differences by selecting a threshold value to account for these differences. In some hybrid WMS embodiments, software residing on device 10 or at another location may determine the threshold value for different airports. U.S. Provisional application 61/272,458 discusses the effect of the selected threshold on the sensitivity of descent detection.

In some embodiments of WMS 30, signals from multiple sensors (such as, signals from both an accelerometer and an altitude sensor) may be used to detect takeoff and/or descent. Using multiple sensors to detect a takeoff or a landing event may provide an additional level of robustness to WMS 30. For instance, if regulations require that device 10 should be in the disabled mode during aircraft taxiing, takeoff detection using only an accelerometer may not ensure complete compliance with these regulations. In these cases, pressure signals from a pressure sensor(s) may be used alone, or along with data from an accelerometer, to detect takeoff.

From disabled mode, WMS 30 may transition the wireless device back to normal mode after landing (see FIG. 2). In some embodiments, WMS 30 may transition device 10 from disabled mode to normal mode by means of a descent timer. The descent timer may be incorporated in wake-up mechanism 22 of device 10, as discussed with reference to the ascent timer. The selected time interval for transitioning device 10 from disabled mode to normal mode after landing may be the same as that used during takeoff, or a new value may be established from prior knowledge or through empirical testing. For example, the time interval from the beginning of descent to aircraft touchdown is typically in the order of 20-25 minutes. Although the discussion above describes an ascent timer to transition device 10 from disabled mode to airborne mode during takeoff, and a descent timer to transition device 10 from disabled mode to normal mode during landing, WMS 30 may also employ other techniques to effect these transitions.

In some embodiments, a WMS may be designed to account for variations seen in some applications. In some applications, the possibility of events such as short flights or air turn-arounds may cause problems with the implementation of an ascent timer to transition device 10 from disabled mode to airborne mode. An air turn-around is a situation in which a pilot makes an unplanned return to the origin airport for any reason, usually after only a short time interval. If an air turn-around occurs and the aircraft returns to the ground before the expiry of the ascent timer, WMS 30 of FIG. 2 may wait indefinitely for an event (such as, for example, a pressure change, an acceleration pulse, or another signal) to indicate the beginning of the descent. To account for these situations, a WMS may include several modifications to the basic flow chart illustrated in FIG. 2.

In these embodiments, data from a sensor(s) may be used in combination with an ascent timer to transition the device to airborne mode. In these embodiments, the time interval of the ascent timer may be shortened and the WMS may monitor data from a sensor(s) to detect when the aircraft reaches the cruise portion of the flight. In one such embodiment, the pressure variation during ascent may be monitored, and device 10 may be transitioned to airborne mode only after a pressure signal indicates that the aircraft has reached cruise altitude. In another embodiment, the cruise portion of flight may be detected by monitoring the level of acoustic noise using an acoustic sensor. Empirical data indicates that acoustic noise may be a reliable indicator of cruise. In these embodiments, the WMS may transition the wireless device to airborne mode only after data from an acoustic sensor(s) indicates that the aircraft has reached cruise altitude.

Figure 7:
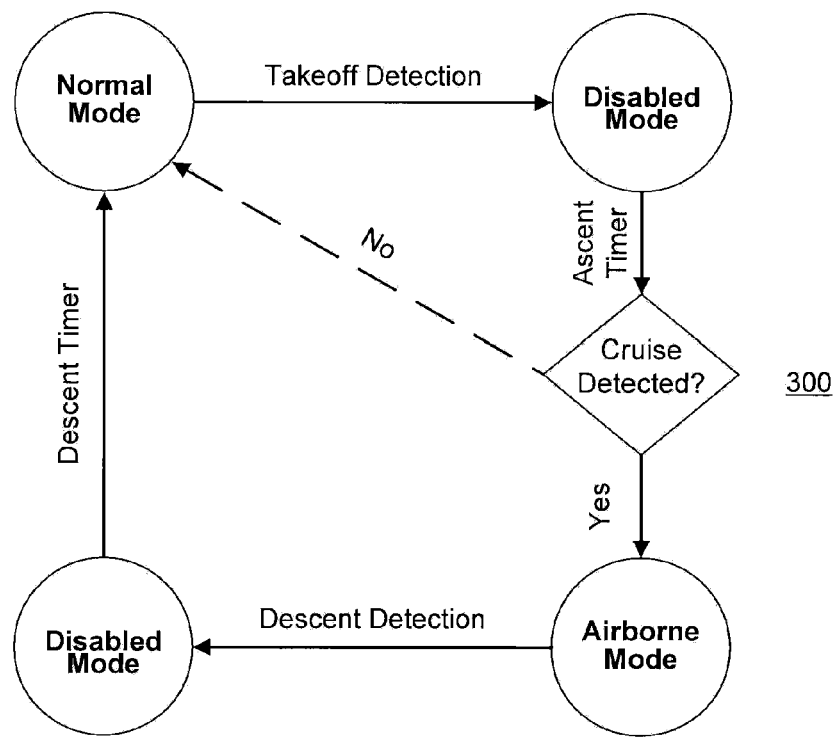
FIG. 7 is a flow chart of another exemplary embodiment of a Wireless Management System.

In embodiments where a cruise-detection mechanism is used to detect the onset of cruise, WMS 30 of FIG. 2 may be modified to provide a cruise interval check before transitioning device 10 to airborne mode after takeoff. FIG. 7 is a flow chart of a WMS 300, executed by processor 14, that includes a cruise interval check before transitioning device 10 to airborne mode. As shown in FIG. 7, in such an embodiment, device 10 may be transitioned to airborne mode only after the cruise-detection mechanism indicates that the aircraft has begun the cruise portion of the flight. If cruise is not detected, WMS 300 may return device 10 to normal mode after a preselected time interval. In this scenario, if an air turn-around occurs, the cruise-detection mechanism may prevent device 10 from being transitioned to airborne mode, and may instead return device 10 to normal mode.

In some embodiments, WMS 30 of FIG. 2 may also include changes to the descent timer. With WMS 30 depicted in FIG. 2, if a low value of time interval is used in the descent timer, it may be possible for device 10 to be transitioned from disabled mode to normal mode before the aircraft has in fact reached the gate or the ground. To eliminate, or reduce, such a possibility, a precautionary measure may be included in some embodiments of the WMS system to ensure that the aircraft is on the ground before returning device 10 to normal mode. In some embodiments, this precautionary step may involve monitoring the barometric pressure over the course of several minutes to ensure that the values remain very close to a fixed value before transitioning device 10 to normal mode.

Figure 8:
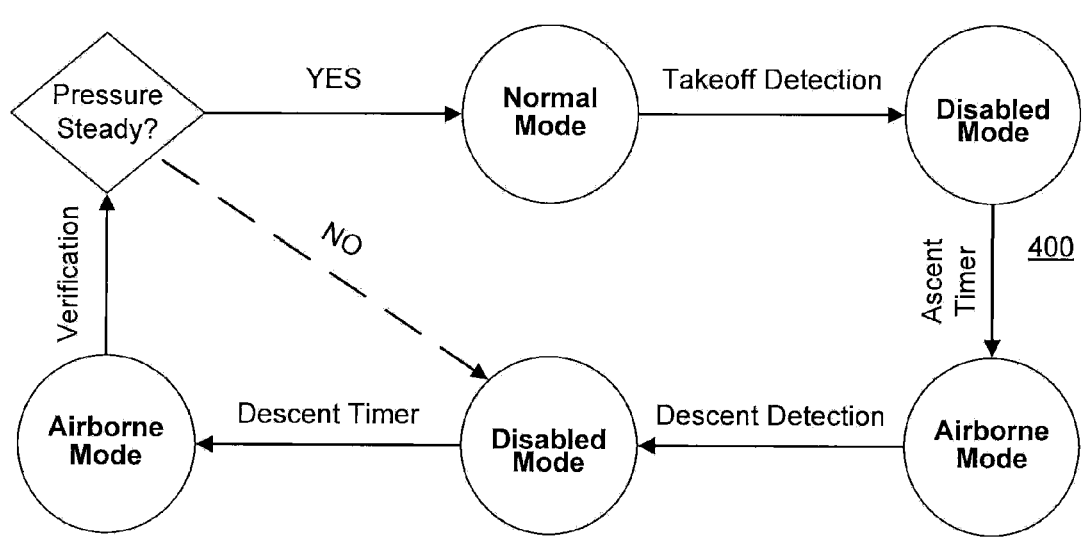
FIG. 8 is a flow chart of another exemplary embodiment of a Wireless Management System.

FIG. 8 illustrates an embodiment of WMS 400, executed by processor 14, wherein a steady barometric pressure is used as a precautionary measure before transitioning device 10 to normal mode. In WMS 400, after the detection of descent, a descent timer may transition device 10 from a disabled mode to an airborne mode (powered on with transmitter off) after a predetermined time interval. Pressure readings from a pressure sensor(s) (or data from another sensor) are then monitored for several minutes to determine if the measured pressure is relatively constant during this time. Variations in observed pressure may indicate that the aircraft is still descending. Therefore, if variations in pressure are observed during this step, WMS 400 may return device 10 to disabled mode and restart the descent timer. This operation may eliminate the possibility of prematurely enabling the wireless transmitter of device 10 while the aircraft is still descending to the ground.

In the discussion of the Device-Centric WMS above, takeoff and descent detection are achieved by sensors and processors embedded within device 10 alone. In some embodiments, knowledge of the details of transportation may be used to supplement the sensor(s) acquired data. Such embodiments of WMS, where previously known information in combination with data from embedded sensors are used to control device 10, are called "Hybrid-WMS." For example, an embodiment of WMS may be running on a wireless device 10 included in a shipment. Detailed information about the shipment, such as the origin and destination airports, the duration of the flight, etc. may be already known. This information may reside in device 10 or in a source remote from device 10. This remote source may include any type of computer (such as, for example, a personal computer, network computer, server, or mainframe computer, etc.) having one or more processors and memory devices that are configured to store and process the information. If the information resides at a location remote from device 10, the WMS may communicate with and download this information from the remote location. This information may include any data that will assist the WMS in takeoff and descent detection. In one such embodiment, the relative location of the wireless device to a reference point may be used to detect when the wireless device is in, or about to be placed in, an aircraft. This reference point may include locations of facilities (such as airports, package storage facilities, etc.) or objects such as aircrafts, wireless access points, loading vehicles, etc, In one such embodiment, the device may communicate with a wireless access point of an aircraft, airport facility, or a wireless access point positioned in a loading vehicle that loads a package containing the device into an aircraft. This communication may be used to detect the relative position of the device with respect to the aircraft. Based on this relative position information, the WMS may be activated.

In some embodiments, the information that may be used by WMS may include one or more of the following: location-based information, such as for example address-based geofence (radius from centroid of address) data, or location information obtained when device 10 communicates with a cell phone tower or other similar installation; time-based information such as flight schedules; operational information such as shipment details maintained by a commercial shipper, custodial scans; historical sensor(s) information; state of associated devices, etc. Associated devices may be devices that may be inferred to be associated to each other based on location information from these devices. In some embodiments, the WMS may employ a polling system, wherein, if a majority of associated devices indicate airborne mode, all devices transition to airborne mode.

In these embodiments, previously known information may be used in addition to the sensor(s) acquired data to transition device 10 between different modes. This additional information may act as safeguards to cover for detection events missed by the Device-Centric WMS. These safeguards may improve the reliability of the WMS and enable better power management of device 10 by reducing the computational requirements associated with continuous monitoring for takeoff and descent detection. For instance, an embodiment of WMS may initiate monitoring of data for takeoff detection only when previously known information indicates that the aircraft may be about to takeoff.

An exemplary embodiment of a Hybrid-WMS implementation is discussed below. A wireless device 10 embedded with sensors, such as for example, one or more of a GPS, an acceleration sensor, and a pressure sensor(s) may be placed within a package undergoing shipment. Device 10 may communicate wirelessly with a remote server containing shipment information about the package, and download shipment related information to the device. This information may include, among others, the origin and destination address, the route that the package will take during shipment, and the mode of transportation of the package. If the package will be transported in an aircraft during any leg of the shipment, the information downloaded may also include flight details such as flight times and the airports that the package may be transported through during shipment. Geofences associated with the identified airports may also be calculated and downloaded to the device. In some embodiments, the geofence data may be used in conjunction with the GPS of device 10 to activate scanning of the sensor(s) data to detect a takeoff or descent event.

If the package is transported through a system where the shipment information is periodically updated by scanning the package during different legs of the shipment, such as for example during a FedEx® shipment, this updated information may also be downloaded to device 10. The updated information may allow the WMS to account for flight delays and situations where the package is re-routed after shipment has begun. Device 10 may communicate with a remote server at predetermined intervals to download updated data, if available. This interval may be determined based on known information about the shipping system, such as the frequency of package scanning, etc. The downloaded information may be used to determine a time window (or update the time window) within which the package may be placed in an aircraft. Device 10 may monitor sensor(s) data to detect a takeoff or landing event in this time window. Monitoring the sensor(s) data only within the time window may increase the accuracy of takeoff and descent detection, by allowing more representative threshold value to be used to detect takeoff and landing.

In embodiments where the wireless device 10 associates with a wireless communication access point (such as, for example a cellular tower), this association information may be used to further refine the time window when device 10 may be placed on an aircraft. The effective range of the access point may determine accuracy of the association information. In applications where the aircraft loading area has an access point, the association information may provide more precise information of the time window when device 10 may be placed within the aircraft. In situations where association data from multiple devices indicate that these devices are co-located or proximate each other, this information may be used to ensure that these multiple packages are transitioned between different modes at the same time.

Although the preceding paragraphs describe an embodiment of Hybrid-WMS in a package shipping application, Hybrid WMS may be used to monitor and control any wireless device. For example, a wireless device 10 carried by a passenger may also be monitored and controlled using WMS. In such an embodiment, previously known information may be downloaded from a system within the aircraft or a remote server to activate the different modes of device 10. For instance, a threshold pressure corresponding to a destination airport may be downloaded to device 10, and device 10 may detect descent using this downloaded threshold pressure value.

Although the preceding paragraphs discuss the use of both sensors and previously known information of shipment details to transition the device 10 between the different operational modes, it is also contemplated that, in some embodiments, previously known information alone may be used to transition device 10 between these different modes without sensor(s) data. As discussed earlier, embodiments of WMS where previously known information (and derivatives of) is used to control a wireless device are called "Remote WMS."

In one Remote WMS embodiment, a system within the aircraft or a remote system may be configured to communicate and download information to a wireless device within the aircraft. This downloaded information may include information related to some or all of takeoff, cruise, descent, and arrival at the terminal gate. WMS may transition device 10 between the different operational modes based on this downloaded information. In such an embodiment, device 10 may be transitioned to disabled mode when information downloaded to device 10 indicates that the device is in an aircraft about to takeoff. Device 10 may be transitioned from disabled mode to another mode (such as, for example, airborne mode or normal mode) based on the information downloaded to device 10, or on the basis of a timer as discussed earlier.

It is also contemplated that, in some embodiments, technology such as passive Radio Frequency Identification (RFID) systems within device 10 coupled with localized wireless communication such as RFID access points or antennas along the operational path of device 10 may provide a signal to transition device 10 back to normal mode when device 10 is on the ground. Any known method, including techniques such as Bluetooth® or ZigBee, may also be used to communicate with wireless device 10.

Although the inventive aspects of the current disclosure are described with reference to a wireless device 10 in an aircraft transitioning between different modes in the sequence illustrated in FIGS. 2, 8, and 9, the systems and methods of the current disclosure may be more widely used. In some embodiments, a WMS may transition device 10 in a difference sequence. For example, WMS may transition device 10 from normal mode directly to airborne mode upon the detection of a signal and/or information downloaded or transmitted to device 10. WMS may further transition device 10 from airborne mode back to normal mode or to a different mode (such as, for example, disabled mode) based on another signal or information.

We claim:

1. A method of management of a wireless device in an aircraft using a processor of the device, comprising:
    configuring the wireless device by:
    automatically transitioning the wireless device using the processor from a normal mode to a disabled mode during aircraft takeoff;
    setting a first period of time based on parameters related to the aircraft takeoff;
    automatically transitioning the wireless device using the processor from the disabled mode to an airborne mode when the aircraft reaches cruise altitude and after expiry of the first period of time;
    automatically transitioning the wireless device using the processor from the airborne mode to the disabled mode during aircraft descent;
    setting a second period of time after transitioning the wireless device from the airborne mode to the disabled mode; and
    automatically transitioning the wireless device using the processor from the disabled mode to the normal mode after the aircraft has landed and after the expiry of the second period of time, the normal mode being a state of the device wherein both the device and a transmitter of the device are activated, the airborne mode being a state of the device wherein the device is activated and the transmitter is deactivated, and the disabled mode being a state of the device wherein both the device and the transmitter are deactivated.

2. The method of claim 1, further including transmitting data indicative of the change in flight condition to the device from a source external to the device.

3. The method of claim 2, wherein transmitting the data includes downloading data related to flight details of the aircraft to the device from a remote computer.

4. The method of claim 3, wherein transmitting the data further includes downloading updated data that indicates changes in flight details of the aircraft to the device from a remote source.

5. The method of claim 2, further including acquiring the data indicative of the change in flight condition from on a sensor embedded in the device.

6. The method of claim 2, further including determining the change in flight condition based both on data transmitted to the device from a source external to the device, and on data acquired by a sensor embedded in the device.

7. The method of claim 1, wherein transitioning the wireless device includes transitioning the device from the normal mode to the disabled mode upon receipt of data indicative of aircraft takeoff.

8. The method of claim 1, wherein transitioning the wireless device includes transitioning the device from the disabled mode to the airborne mode upon receipt of data indicative of the aircraft reaching cruise altitude.

9. The method of claim 1, wherein transitioning the wireless device includes transitioning the device from the airborne mode to the disabled mode upon receipt of data indicative of aircraft descent.

10. The method of claim 1, wherein transitioning the wireless device includes transitioning the device from the disabled mode to the normal mode upon receipt of data indicative of the completion of aircraft landing.

11. A method of management of a wireless device in an aircraft by a processor, comprising:
    automatically transitioning the device from a normal mode to a disabled mode during aircraft takeoff using the processor, the normal mode being a state of the device wherein both the device and a transmitter of the device are activated, and the disabled mode being a state of the device wherein both the device and the transmitter are deactivated;
    setting a first period of time based on parameters related to the aircraft takeoff;
    automatically transitioning the device from the disabled mode to an airborne mode using the processor, after the aircraft reaches a predetermined altitude and after expiry of the first period of time, the airborne mode being a state of the device wherein the device is activated and a transmitter of the device is deactivated;
    setting a second period of time; and
    automatically transitioning the device from a disabled mode to the normal mode after the aircraft has landed and after the expiry of the second period of time using the processor.

12. The method of claim 11, further including automatically transitioning the device from the airborne mode to the disabled mode using the processor, during descent of the aircraft.

13. The method of claim 11, wherein automatically transitioning the device from the disabled mode to the airborne mode includes receipt of data indicative of aircraft takeoff.

14. The method of claim 13, wherein receipt of the data includes acquiring the data indicative of aircraft takeoff by a sensor embedded in the device.

15. The method of claim 14, wherein the sensor includes at least one of an accelerometer and a pressure sensor.

16. The method of claim 13, wherein receipt of the data includes downloading data on flight details of the aircraft to the device from a source external to the device.

17. The method of claim 16, wherein downloading data of flight details further includes downloading updated data that indicates changes in the flight details.

18. The method of claim 13, wherein receipt of the data indicative of aircraft takeoff includes determining aircraft takeoff based on both data downloaded to the device from a source external to the device and data collected by a sensor embedded in the device.

19. A system for management of a wireless device in an aircraft, comprising:
    a sensor for detecting a change in the flight condition of the aircraft;
    a wireless device configured to be positioned within the aircraft and to receive data regarding the change in the flight condition from the sensor; and
    software residing in the wireless device, the software being configured to:
    automatically transition the wireless device from a normal mode to a disabled mode during aircraft takeoff;
    set a first period of time based on parameters related to the aircraft takeoff;

automatically transition the wireless device from the disabled mode to an airborne mode when the aircraft reaches cruise altitude and after expiry of the first period of time;

automatically transition the wireless device from the airborne mode to the disabled mode during aircraft descent;

set a second period of time after transitioning the wireless device from the airborne mode to the disabled mode; and automatically transition the wireless device from the disabled mode to the normal mode after aircraft landing and after expiry of the second period of time, the normal mode being a state of the device wherein both the device and a transmitter of the device are activated, the airborne mode being a state of the device wherein the device is activated and a transmitter of the device is deactivated, and the disabled mode being a state of the device wherein both the device and the transmitter are deactivated.

20. The system of claim 19, wherein the software is configured to transition the device from the normal mode to the disabled mode upon receipt of data indicative of aircraft takeoff.

21. The system of claim 20, wherein the data indicative of aircraft takeoff is acquired from a sensor embedded in the device.

22. The system of claim 21, wherein the sensor includes one of an accelerometer and a pressure sensor.

23. The system of claim 20, wherein the data indicative of aircraft takeoff is downloaded to the device from a source external to the device.

24. The system of claim 20, wherein the data indicative of aircraft takeoff is determined based on both data downloaded to the device from a source external to the device and data acquired by a sensor embedded in the device.

25. A system for management of a wireless device, comprising:

a sensor for detecting a change in the flight condition of the aircraft;

a processor for executing program instructions for management of the wireless device; and a non-transitory computer-readable storage medium for storing the program instructions, the processor when executing the program instructions, performs a process to:

automatically transition the wireless device from a normal mode to a disabled mode;

set a first period of time based on parameters related to aircraft takeoff;

automatically transition the wireless device from the disabled mode to an airborne mode after expiry of the first period of time;

automatically transition the wireless device from the airborne mode to the disabled mode;

set a second period of time after transitioning the wireless device from the airborne mode to the disabled mode; and automatically transition the wireless device from the disabled mode to the normal mode upon receipt of data that is indicative of a change in flight condition of the aircraft and after expiry of the second period of time, the normal mode being a state of the device wherein both the device and a transmitter of the device are activated, the airborne mode being a state of the device wherein the device is activated and a transmitter of the device is deactivated, and the disabled mode being a state of the device wherein both the device and the transmitter are deactivated.

26. The system of claim 25, wherein the processor performs a process to transition the device (i) from the normal mode to the disabled mode during aircraft takeoff, (ii) from the disabled mode to the airborne mode when the aircraft reaches cruise altitude, (iii) from the airborne mode to the disabled mode during aircraft descent, and (iv) from the disabled mode to the normal mode after aircraft landing.

27. A wireless device, comprising:

a sensor configured to measure one or more environmental parameters associated with a change in a flight condition of an aircraft;

a processor configured to receive real-time signals from the sensor and based on the received signals:

automatically transition the wireless device from a normal mode to a disabled mode;

set a first period of time based on parameters related to aircraft takeoff;

automatically transition the wireless device from the disabled mode to an airborne mode after expiry of the first period of time;

automatically transition the wireless device from the airborne mode to the disabled mode;

set a second period of time after transitioning the wireless device from the airborne mode to the disabled mode; and automatically transition the wireless device from the disabled mode to the normal mode after expiry of the second period of time, the normal mode being a state of the device wherein both the device and a transmitter of the device are activated, the airborne mode being a state of the device wherein the device is activated and a transmitter of the device is deactivated, and the disabled mode being a state of the device wherein both the device and the transmitter are deactivated.

28. The device of claim 27, wherein the sensor includes an accelerometer.

29. The device of claim 27, wherein the sensor includes a pressure sensor.

30. The device of claim 27, wherein the processor is configured to transition the device (i) from the normal mode to the disabled mode during aircraft takeoff, (ii) from the disabled mode to the airborne mode when the aircraft reaches cruise altitude, (iii) from the airborne mode to the disabled mode during aircraft descent; and (iv) from the disabled mode to the normal mode after aircraft landing.

31. A non-transitory computer-readable storage medium storing program instructions for performing a method of management of a wireless device aboard an aircraft when executed by a processor of the wireless device, the method comprising steps performed by the processor of:

receiving data indicative of a flight condition of the aircraft from a sensor;

automatically transitioning the wireless device from a normal mode to a disabled mode during aircraft takeoff;

setting a first period of time based on parameters related to aircraft takeoff;

automatically transitioning the wireless device from the disabled mode to an airborne mode when the aircraft reaches cruise altitude and after expiry of the first period of time;

automatically transitioning the wireless device from the airborne mode to the disabled mode during aircraft descent;

setting a second period of time after transitioning the wireless device from the airborne mode to the disabled mode; and automatically transitioning the wireless device from the disabled mode to the normal mode after the aircraft has landed and after expiry of the second period of time, the normal mode being a state of the device wherein both the device and a transmitter of the device are activated, the airborne mode being a state of the device wherein the device is activated and a transmitter of the device is deactivated, and the disabled mode being a state of the device wherein both the device and the transmitter are deactivated.

32. The non-transitory computer-readable storage medium of claim 31, wherein transitioning the wireless device includes transitioning the device from the normal mode to the disabled mode upon receipt of data indicative of aircraft takeoff.

33. The non-transitory computer-readable storage medium of claim 32, wherein transitioning the wireless device further includes transitioning the device from the disabled mode to the airborne mode upon receipt of data indicative of the aircraft reaching cruise altitude.

34. A method of management of a wireless device using a processor of the device, comprising:

automatically transitioning the wireless device using the processor from a normal mode to a disabled mode;

setting a first period of time based on parameters related to aircraft takeoff;

automatically transitioning the wireless device using the processor from the disabled mode to an airborne mode after expiry of the first period of time;

automatically transitioning the wireless device using the processor from the airborne mode to the disabled mode;

setting a second period of time after transitioning the wireless device from the airborne mode to the disabled mode; and automatically transitioning the wireless device using the processor from the disabled mode to the normal mode based at least on data that indicates the relative position of the device with respect to a reference point and after expiry of the second period of time, the normal mode being a state of the device wherein both the device and a transmitter of the device are activated, the airborne mode being a state of the device wherein the device is activated and a transmitter of the device is deactivated, and the disabled mode being a state of the device wherein both the device and the transmitter are deactivated.

35. The method of claim 34, wherein the reference point includes one of a specific location or an object.

36. The method of claim 34, wherein the reference point includes an aircraft.

37. The method of claim 34, wherein the reference point includes an airport.

38. The method of claim 34, wherein the transitioning of the device is further based on data that indicates a change in flight condition of an aircraft.

39. The method of claim 38, wherein the change in flight condition includes one of scheduled, historical, or actual change in flight condition of the aircraft.

40. The method of claim 38, wherein the change in flight condition includes one of takeoff or landing of the aircraft.

41. The method of claim 34, wherein the reference point is a wireless access point.

42. The method of claim 41, wherein the wireless access point is positioned on a mobile machine.

* * * * *